TAPERED AND GROOVED BOBBIN

Original Filed Feb. 10, 1965 2 Sheets-Sheet 1

INVENTOR
JULIO LIMANTOUR
ATTORNEY

TAPERED AND GROOVED BOBBIN

Original Filed Feb. 10, 1965 2 Sheets-Sheet 2

INVENTOR.
JULIO LIMANTOUR
BY
ATTORNEY

United States Patent Office

Re. 27,811
Reissued Nov. 20, 1973

27,811

TAPERED AND GROOVED BOBBIN

Julio Limantour, Durham, Pa., assignor to Julio Limantour

Original No. 3,292,876, dated Dec. 20, 1966, Ser. No. 431,511, Feb. 10, 1965. Application for reissue Jan. 12, 1970, Ser. No. 15,320, which is a continuation of abandoned reissue application Ser. No. 710,440, Feb. 26, 1968

Int. Cl. B65h *75/10*

U.S. Cl. 242—118.31 6 Claims

Matter enclosed in heavy brackets [ ] appears in the original patent but forms no part of this reissue specification; matter printed in italics indicates the additions made by reissue.

*ABSTRACT OF THE DISCLOSURE*

*An improved bobbin is formed with a body of reinforced plastic, having end caps of a resilient plastic material. The larger end has around it a plurality of parallel disposed rings which may be formed so that they are integral with the body portion of the bobbin.*

*This reissue application is a continuation of reissue application Ser. No. 710,440, filed Feb. 26, 1968, now abandoned.*

This invention relates to bobbins and quills for textile machines. More particularly, it relates to such above improved bobbins which are characterized by efficient utilization, long life and resistance to deformation and erosion.

Bobbins and quills are generally used in the textile industry for winding textile yarns thereon in textile machines such as looms, shuttles, twisters and the like. Thread wound as a filling package on the bobbins has to be drawn off therefrom over a bobbin end so that bobbins are advantageously provided with a tapered end portion. To prevent unintended and too rapid a thread removal, such tapered portion may be circumferentially grooved or indented. The grooves are spaced so that there is a variation in the rate of removal of the thread depending upon whether or not it is being drawn from the grooved or land sections of the tapered portion.

Heretofore, a commonly used type of bobbin or quill has consisted of a high grade wood which is lathe turned and are metal tipped with a metal such as brass at either end. The configuration of the bobbin is generally that of a tapered truncated cone of circular cross section, the base of the cone, i.e., its larger end being continuous with a substantially wider cylindrical base having a plurality of steel or other strong metal rings disposed therearound in spaced parallel relationship to adapt the bobbin for insertion into the textile machine for winding thread thereon. One of the aforesaid metal tips, is provided at the free end of the cylindrical base. The tips function to absorb shock and impacts during the operation of the bobbins and quills.

It has been found that bobbins and quills constructed of wood and even if of high quality and very carefully made during the lathe turning operation, suffer from the inherent disadvantage that they cannot be uniform in nature. This is because wood is essentially a naturally fibrous and cellular material that is not of a homogeneous nature and uniform density due to its cellular nature. Also, it is humidity responsive and undergoes a hygroscopic reaction in the ambient atmosphere. Because of such non-homogeneous fibrous, non uniform nature of wood, bobbins made therefrom are of necessity relatively short lived. This can be understood when it is realized that a bobbin in operation is a body which is rotated at a high velocity during the thread winding and that the non-homogeneity of the wood with its resultant dissymmetry causes centrifugal forces during the rotation of the bobbin whereby its physical axis does not coincide precisely with the axis of rotation. Consequently, the wooden bobbin becomes further distorted from undesired angular displacement thereby appreciably cutting down its useful life. Furthermore, the metal tips at the cylindrical base end and the tapered conical portion end in their exposure to normal shocks plus the shocks imparted due to the angular displacement of the rotating bobbin readily become detached therefrom thereby further contributing to the short life of the quill and bobbin.

In addition, although the surface of a wooden bobbin is highly polished and may even be varnished, thread still tend to adhere to it and, consequently, removal of thread therefrom may be disadvantageously impeded by such adherence. This in turn requires greater force to be expected on the thread being removed which may result both in the impairment of the bobbin surface and breakage of the thread.

In order to overcome some of the disadvantages presented by the aforesaid metal tipped wooden bobbins, there have been utilized bobbins made of plastc. Plastic presents the advantage of providing an inherently highly smooth surface which eliminates friction between it and the thread and also the advantage of being a material that is homogeneous, nonreactive with the atmosphere and not readily deformed. Such plastic bobbins have been made in the form of an integral structure consisting of a single type plastic material and have been configured similar to the wooden bobbins in that they essentially comprise a relatively long tapered truncated conical portion and a relatively short cylindrical base, some having parallel spaced steel rings therearound for insertion into the textile machine. However, these plastic bobbins have presented the disadvantage that they are readily susceptible to the deleterious effects of shocks and impacts due both to their integral nature and to the plastic material used therefor.

To provide strong plastic bobbins, there have been utilized bobbin structures of plastic reinforced with [Fiberglas] *glass fibers.* Although such bobbins have provided the desired qualities of strength and chemical inertness, during their use they are subjected to scuffing at their ends with the resultant exposure of the glass fibers and consequently, thread on the bobbin has tended to be caught on the exposed glass fibers causing damage and disruption of smooth operation.

In both the known wooden and plastic type bobbins the use of spaced steel rings or other strong metal rings around the cylindrical base portion of the bobbin tend to abrade the bobbin surface portion whereat they are in contact, with the consequence that the rings tend to slip and therefore render the bobbin incapable of being properly inserted into the textile machine and therefore no longer useful. In addition, since the base is generally of right cylindrical configuration, the insertion of the bobbin into the textile machine is not a facile step since time and effort have to be taken by the operator to insure that the bobbin is properly seated in the recess therefor in the machine.

Accordingly, it is an important object of this invention to provide an improved plastic bobbin which is of simple construction, has long life and is resistant to shocks and impacts during its operation.

It is another object to provide an improved plastic bobbin in accordance with the preceding object which is constructed of a plastic material that imparts advantageous characteristics of strength, smoothness homogeneity thereto.

Generally speaking according to the invention, there is provided a bobbin or quill comprising a body portion consisting of a first strong comparatively rigid plastic material and which comprises a larger narrower truncated conical moiety and a shorter substantially cylindrical moiety continuous and integral with the conical moiety. At least a tip consisting of a second strong, comparatively resilient plastic material is provided firmly bonded to the end of the conical moiety, the tip being so tapered as to provide a continuous outer smooth surface with the conical moiety. There are further provided a plurality of parallel disposed spaced grooves substantially perpendicular to the axis of the bobbin around a part of the conical portion and means are included in intimate contact with the cylindrical moiety for adapting the bobbin to be inserted into a textile machine.

For a better understanding of the invention together with other and further objects thereof, reference is had to the following description in conjunction with the accompanying drawing and its scope will be pointed out in the appended claims.

Figure 3:
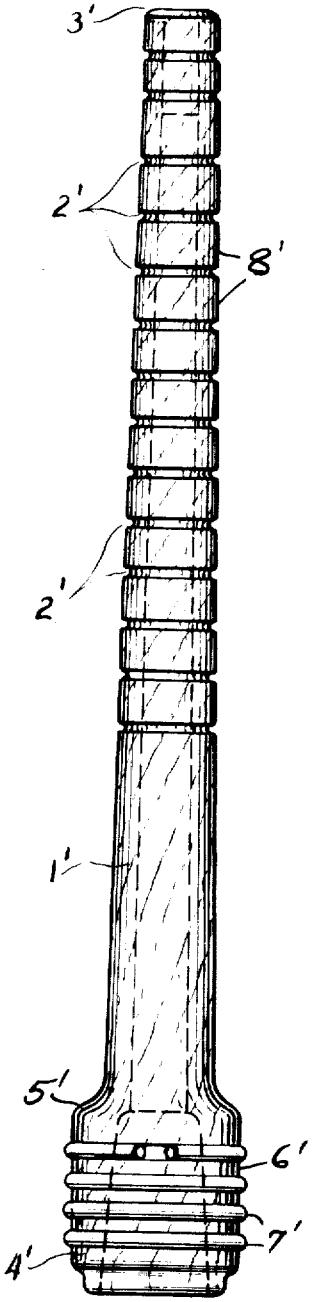
FIG. 3 is a longitudinal elevational view of the known wood bobbin or quill.

Referring now to FIG. 3 wherein there is shown a conventional wooden bobbin or quill, it is seen that this structure comprises a body which comprises a relatively long and narrow truncated conical portion 1′ which is integral and continuous with a shorter, wider and cylindrical portion 5′. Attached to the narrow end of conical portion 1′ is a metal tip 3′ and attached to the end of cylindrical portion 5′ is a metal tip 4′. Provided around a part of conical portion 1′ are spaced parallel disposed grooves 2′, which are substantially perpendicular to the axis of the bobbin. A bore extends through the length of the bobbin and through metal tip 4′ and is tapered similarly as the spindle of the textile machine which it engages when it is inserted for operation into such machine. Provided around cylindrical portion 5′ are substantially parallel disposed spaced rings suitably consisting of a strong metal for adapting the bobbin to be inserted into such textile machine and to engage the spindle thereof. As has been brought out hereinabove, such known wooden bobbin presents the deficiencies in that it is of unhomogeneous material due to its fibrous and cellular nature, and its susceptibility to react hygroscopically with the ambient atmosphere, is readily distorted under operating conditions and consequently its lifetime of practicable use is severely curtailed thereby. In addition, because of its ready susceptibility to such distortion, the shocks and impacts to which its metal tips 3′ and 4′ are subjected to are of such nature that they readily are detached from the wooden body of the bobbin, thereby further shortening the life of the device. In addition, the relatively rough surface of the wood, highly polished or varnished, causes undesirable adhesion between it and the thread wound therearound whereby the mechanical means utilized for removing thread therefrom has to be designed with this fact in mind and therefore may lead to subjection of the thread to greater than desired forces by such means with the resulting frequent breakage of thread.

As has also been stated above, the grooves 2′ function to introduce a variation in the rate of the removal of the thread depending upon whether or not it is being drawn from the grooves or land sections 8′ of the tapered portion.

Figure 2:
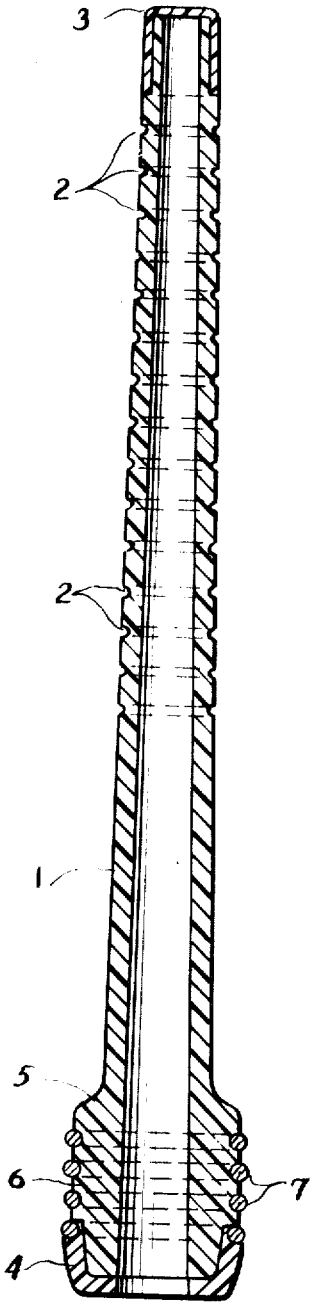
FIG. 2 is a longitudinal cross-sectional view of the embodiment shown in FIG. 1.
Figure 1:
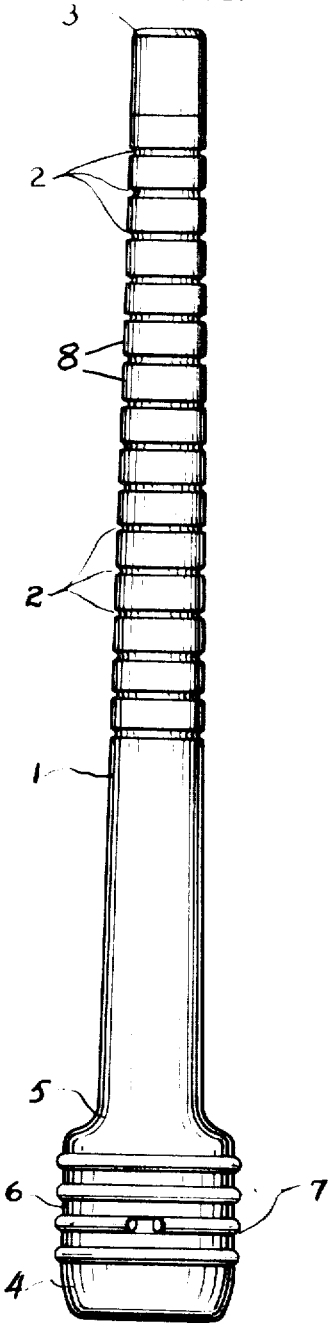
FIG. 1 is a longitudinal elevation view of an illustrative embodiment constructed in accordance with the principles of the invention.
Figure 4:
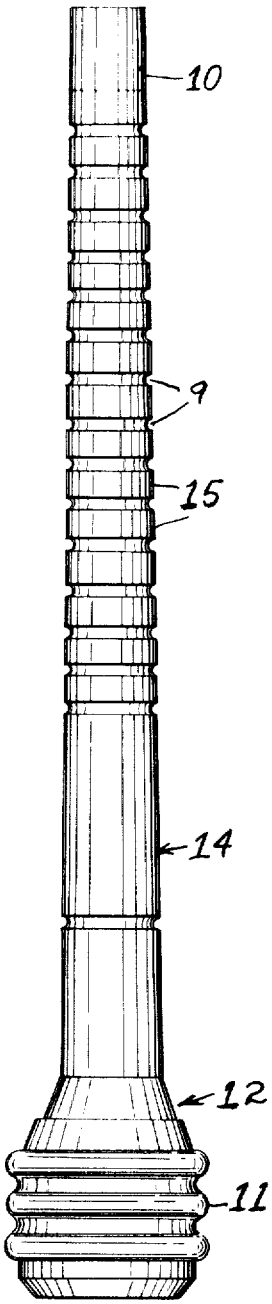
FIG. 4 is a longitudinal elevational view of another illustrative embodiment constructed in accordance with the principles of the invention.
Figure 5:
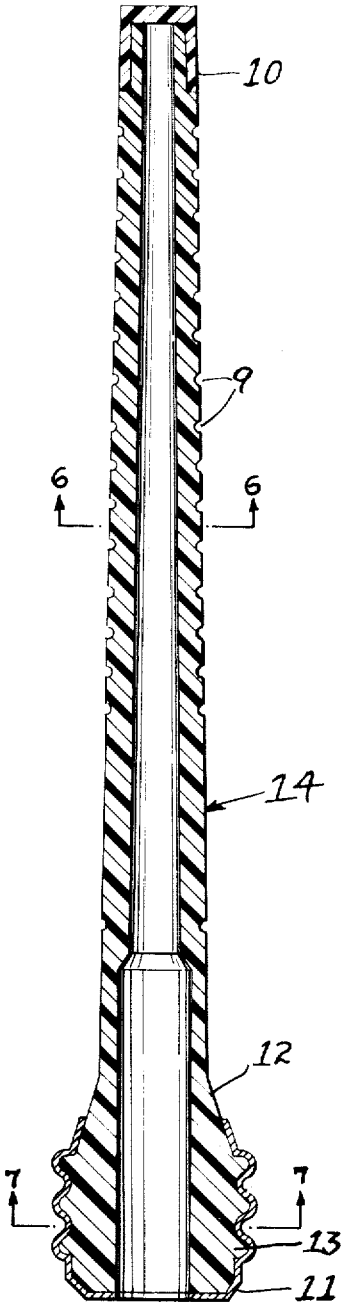
FIG. 5 is a longitudinal cross-sectional view of the embodiment shown in FIG. 4.
Figure 6:
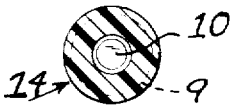
FIG. 6 is a view taken along line 6—6 of FIG. 1 looking in the direction of the arrows.
Figure 7:
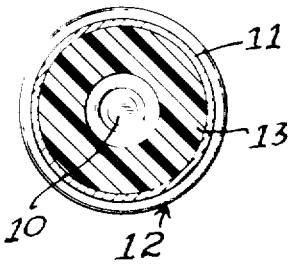
FIG. 7 is a view taken along line 7—7 of FIG. 1 looking in the direction of the arrows.

Referring now to FIGS. 1 and 2 wherein there is shown an illustrative embodiment constructed in accordance with the principles of the invention, it is seen that the bobbin essentially has the same outer configuration as the bobbin shown in FIG. 3, i.e. it comprises a narrow tapered truncated conical portion 1 integral with a shorter, wider, substantially cylindrical portion 5. However, in contrast with the bobbin of FIG. 3, the body of the bobbin of FIGS. 1 and 2 consists of a strong comparatively rigid plastic material such as a polyester which effectively exceeds in strength a commensurate volume of wood and which presents the advantages of providing a smooth surface and thereby eliminates any possibility of adhesion thereto of thread wound therearound and of a material which is of a homogeneous nature and which undergoes no hygroscopic or chemical reaction with the atmosphere.

Firmly bonded to the end of conical portion 1 by suitable means, well known in the art such as a press fit, plasticizer bond and the like, is a cap 3 which consists of a comparatively resilient plastic material such as nylon and the like.

Similarly, there is bonded to the end of cylindrical portion 5 a cap 4 which also consists of a strong resilient plastic material which may suitably be the same or a material similar to the material of cap 3.

As in the wooden bobbin of FIG. 3, the bobbin of FIGS. 1 and 2 has grooves 2 corresponding to the grooves 2′ around a part of conical portion 1 for the same purpose and as outlined in the description of the structure of FIG. 3. Parallel disposed rings 7 around cylindrical portion 5, also serve the same purpose as the rings 7′, i.e. adaptation of the bobbin for proper insertion into a textile machine. In this connection, it is also noted that tapered bore is provided through the body and tip 4 for enabling the intimate engagement of the bobbin with the tapered rotatable spindle of the textile machine.

In connection with the device shown in FIGS. 1 and 2, it is to be noted that cap 3 is so tapered as to be smoothly continuous in peripheral outline with conical portion 1 whereby conical portion 1, together with cap 3 comprises a smoothly continuous truncated cone. It is also to be noted that cap 4 is not selected to be continuous in peripheral outline with the periphery of cylindrical portion 5 but is slightly tapered, whereby there is enabled a facile insertion of the bobbin into the textile machine since such taper performs the function of a guide. The middle portion 6 of cylindrical portion 5 is of course the widest portion and essentially has configuration of a right circular cylinder.

With the bobbin illustrated in FIGS. 1 and 2 and constructed in accordance with the principles of invention, the use of resilient plastic tips 3 and 4 on the respective ends thereof provides the further advantage of shock and impact absorbers which have an elastic reaction thereto, thereby serving to prevent a good portion of such shock and impacts from being transmitted to the rigid plastic body portion whereby the life of the bobbin is still further enhanced.

It is of course to be realized that the homogeneous and strong nature and the weight characteristics of the plastic comprising the body of the bobbin enable it to be used in a size wherein its outer diameter is substantially less than the outer diameter of the wooden bobbin of FIG. 3 whereby there is enabled a greater loading of thread thereon and consequently greater efficiency in its use.

It has been found that particularly efficacious plastic material for use as the rigid plastic material of the body of the inventive bobbin as an injection molding compound as disclosed in the patent of Rexford Bradt, United States Patent No. 2,877,501. As disclosed in this patent, this compound comprises an injection molding compound comprising elongated granules of approximately one-sixteenth to one-eighth inch in diameter and having therein 15 to 60% by weight of generally parallel glass filaments extending longitudinally of the granule, the filaments being coated with a polymerized sizing compound and a superjacent thermoplastic composition. The sizing may be polyvinyl, acetate or a polyester and the superjacent thermoplastic molding composition may be polystyrene and styrene-butadiene copolymer.

Referring now to FIGS. 4 to 7, wherein there is shown another illustrative embodiment constructed in accordance with the principles of the invention, the bobbin shown therein is essentially similar in size and configuration to the bobbin shown in FIGS. 1 and 2. Thus, the bobbin shown therein comprises a tapered conical portion 14 integral with the cylindrical base portion 12 comprising a mid-portion 13 which is essentially configured as a right circular cylinder. Also, as in the bobbin of FIGS. 1 and 2 grooves 9 are provided corresponding in structure and in purpose to grooves 2 and cap 10 consisting of a strong resilient plastic material corresponding in structure and function to that of cap 3.

The essential distinction between the embodiment of FIGS. 4 to 7 and the embodiment of FIGS. 1 and 2, is the use of a metal cap 11 intimately enveloping the bulk of cylindrical portion 12 in place of the metal rings 7 and the resilient material plastic cap 4 of the bobbin of FIGS. 1 and 2.

With the use of such metal cap 11, there is enabled the elimination of the disadvantage produced when steel rings such as 7 in FIGS. 1 and 2 are used, such disadvantage being abrasion of the surface proximate to the steel rings caused by the forces encountered in the insertion and operation of the bobbin whereby the rings tend to become loosened, slide and consequently render the bobbin unfit for use. Effectively, the use of cap 11 provides a structure wherein the means for adapting the bobbin to insertion into the textile machine is integral with the body of the bobbin whereby the disadvantage of slippage of discrete steel rings due to surface abrasion is not encountered.

As in the embodiment of FIGS. 1 and 2, the end portion enveloped by cap 11 is tapered to permit the bobbin to be readily guided during its insertion into the textile machine.

With the structure shown in FIGS. 4 to 7, there is provided a bobbin which combines the advantages of a rigid plastic body and the beneficial results that ensue therefrom, the resilient plastic cap at the end of the tapered conical portion to enable an enhancement of the ability of the bobbin to withstand the impact and shock and the use of the metal cap 11 enveloping substantially the bulk of the cylindrical portion of the body to mitigate the deficiencies of discrete steel rings and also to impart further impact and shock absorbing ability. Of course, the body of the bobbin 4 to 7 is advantageously constructed of the preferred injection molding compound as disclosed in the aforementioned United States Patent 2,877,501. In fact, such molding compound facilitates formation of the very snug fit between the cylindrical portion 12 and cap 11 by forming the construction with an injection molding process.

From the foregoing, it is seen that with the bobbin constructed in accordance with the principles of the invention, there is provided a structure which in addition to overcoming the disadvantages inherent in wooden bobbins, also overcome the disadvantages inherent in plastic and particularly [fiberglas] *glass fiber* reinforced plastic bobbins. Thus, plastic caps provided at the ends of the bobbin constructed in accordance with the invention in addition to providing all of the advantages as set forth hereinabove prevent the exposure of glass fibers with the consequent catching of thread thereon.

While there have been described what are considered to be the preferred embodiments of the invention, it will be obvious to those skilled in the art that various changes and modifications may be made therein without departing from the invention and it is, therefore, aimed to cover all such changes as fall within the true spirit and scope of the invention.

An advantage which accrues from the use of a bobbin with a plastic body is the ability of the plastic material to be colored in its formation, different colors thus enabling the use of different colored plastics for different types of grades of threads to be respectively wound thereon. Such coloring may be effective without the impairment of the grooves of the surface of the plastic or impairment of its physical characteristics. By contrast, bobbins having wooden bodies can only be differently colored by means of paints and coatings which flake, are tacky and very short lived.

What is claimed as new and desired to be secured by Letters Patent of the United States is:

1. A bobbin or quill comprising a body portion consisting of a first strong and [fiberglas] *glass fiber* reinforced plastic material, said body portion comprising a longer narrower tapered truncated conical moiety and a shorter wider substantially cylindrical moiety continuous with and integral with said conical moiety, respective caps consisting of a second strong and comparatively resilient [plastic] material firmly bonded to the respective ends of said moieties, the cap on said conical moiety *being made of plastic and* being tapered so as to provide a continuous smooth surface therewith, the cap on said cylindrical moiety *being made of plastic or metal and* being so configured as to provide a continuous smooth outer surface therewith, a plurality of parallel disposed spaced grooves substantially perpendicular to the axis of said bobbin around a portion of said conical portion and a plurality of parallel disposed rings substantially perpendicular to said axis around said cylindrical portion for adapting said bobbin to be inserted into a textile machine.

2. A bobbin as defined in claim 1 wherein said [fiberglas] *glass fiber* reinforced plastic material comprises an injection molding compound comprising elongated granules of approximately one-sixteenth to one-eighth inch in diameter and having therein from about fifteen to sixty percent by weight of the granule of generally parallel glass filaments extending longitudinally of the granule, said filaments being coated with a polymerized sizing compound and a superjacent thermoplastic molding composition.

3. A bobbin or quill comprising a body portion consisting of a first strong and comparatively rigid plastic material, said body portion comprising a longer narrower tapered truncated conical moiety and a shorter, wider, substantially cylindrical moiety continuous and integral with said conical moiety, respective caps consisting of a second strong and comparatively resilient plastic material firmly bonded to the respective ends of said moieties, the cap on said conical moiety being tapered so as to provide a continuous smooth surface therewith, the cap on said cylindrical moiety being so configured as to provide a continuous smooth outer surface therewith, a plurality of parallel disposed spaced grooves substantially perpendicular to the axis of said bobbin around a portion of said conical portion and a plurality of parallel disposed spaced rings substantially perpendicular to said axis around said cylindrical portion for adapting said bobbin to be inserted into a textile machine.

*4. The bobbin or quill of claim 1 wherein the cap on the cylindrical moiety is made of metal.*

*5. The bobbin or quill of claim 4 wherein the cylindrical moiety is formed with integral annular ridges perpendicular to the axis of the bobbin, the metal cap*

*intimately enveloping the ridged moiety, said metal-enveloped ridges thus forming the parallel disposed rings.*

*6. The bobbin or quill of claim 2 wherein the cap on the cylindrical moiety is made of metal, the cylindrical moiety being formed with integral annular ridges perpendicular to the axis of the bobbin, the metal cap intimately enveloping the ridged moiety, said metal enveloped ridges thus forming the parallel disposed rings.*

References Cited

The following references, cited by the Examiner, are of record in the patented file of this patent or the original patent.

UNITED STATES PATENTS

| | | | |
|---|---|---|---|
| 2,403,417 | 7/1946 | Van Deventer | 242—118.31 |
| 2,419,415 | 4/1947 | Morf | 242—118.31 |
| 2,877,501 | 3/1959 | Bradt | 264—143 |
| 2,967,026 | 1/1961 | Van Deventer | 242—118.31 |
| 3,107,067 | 10/1963 | Atwood et al. | 242—118.32 |

FOREIGN PATENTS

| | | | |
|---|---|---|---|
| 308,588 | 9/1929 | Great Britain | 242—118.31 |

GEORGE F. MAUTZ, Primary Examiner